United States Patent Office 3,400,995
Patented Sept. 10, 1968

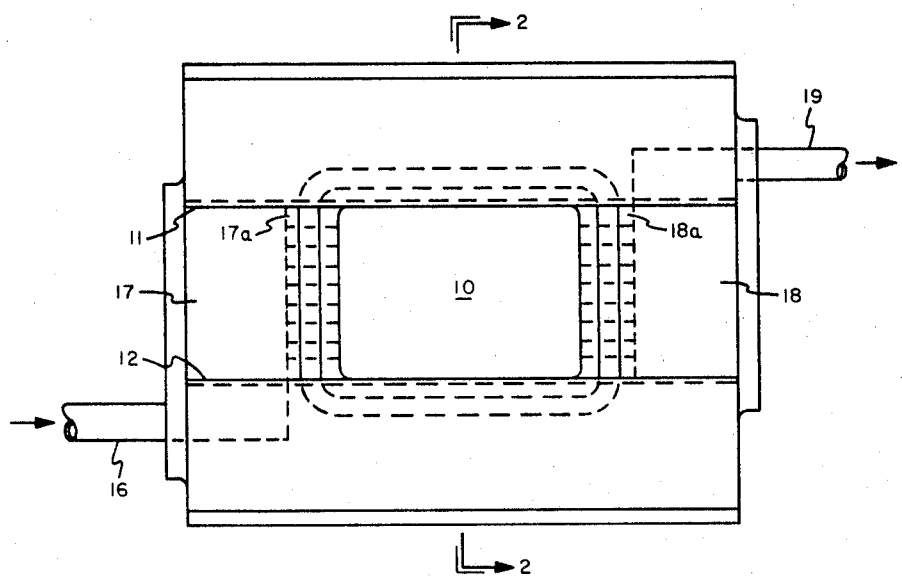
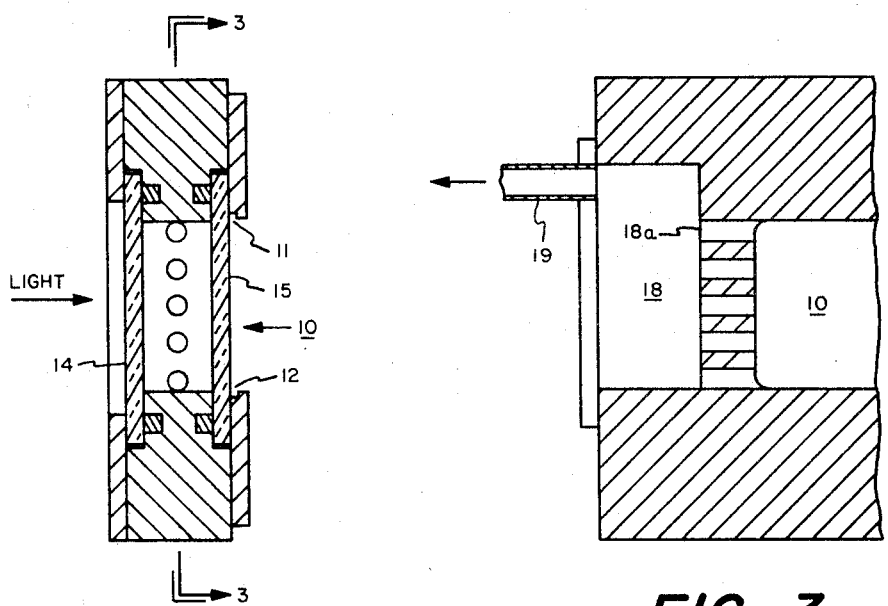
FIG. 1
FIG. 2
FIG. 3

3,400,995
HEAT DISSIPATING FILM GATE
Willy Borberg, Briarcliff Manor, and Reginald A. White, Chappaqua, N. Y., assignors to General Precision Systems Inc., a corporation of Delaware
Filed Dec. 9, 1965, Ser. No. 512,736
7 Claims. (Cl. 352—222)

ABSTRACT OF THE DISCLOSURE

An improved film gate in which a cooling chamber having a sapphire wall is used between the light source and the film. The emulsion surface of the film is held in intimate contact with the sapphire plate for improved heat transfer. In addition the circulation of the coolant through the cooling chamber has been made to be uniform, without air traps in the system. The inlet and outlet of the chamber are each a plurality of parts so as to avoid dead flow spaces. Air bubbles are eliminated by use of a closed, non-sealed system. Intimate contact is made by use of air pressure.

---

The present invention relates to film traps or film gates for projectors of still and/or motion pictures.

As is well known, film both in strip and slide form is normally a transparent plastic base supporting an emulsion. Both the plastic base and the emulsion are heat sensitive, subject to being distorted and destroyed when overheated.

When a picture is being projected on a screen by passing light through the film, heat is transferred to the film, particularly the emulsion. The apparent brilliance or intensity of the projected picture is, among other factors, a function of the amount of light passed through the film and the ambient light conditions under which the picture is projected and displayed. All other considerations being equal, the amount of heat transmitted to the film is a function of the amount or intensity of light passed through the film. Thus, the amount or intensity of light that may be passed through a film is limited by the heat sensitive characteristics of the film.

Various attempts have been made to prevent transfer of heat from the light generating source to the film during projection of a picture and/or to cool the film and particularly the emulsion in various stages of picture projection. These efforts have had various degrees of success without permitting substantial increase in the amount of light passed through a film without damage to the film.

Up to the present time projection of a satisfactory picture in full daylight conditions has not been practical. This is because the large amount of light that must be passed through a film in order to project a picture in full daylight would transfer more destructible heat to the film than could be dissipated by known film cooling and heat dissipation methods.

The present invention is a highly improved film gate which is a fluid cooled film gate that employs a highly efficient heat transfer and dissipation system. This system maintains the temperature of the emulsion on film at a low, safe level during projection of a picture while passing light having intensity of 4 to 5 times the intensity heretofore possible by using the best of other known cooling systems. While practicing the present invention, passage of more than 75,000 lumens incident to the screen per square inch of aperture has been obtained, during still-picture projection, without damage to the film. The intensity of the light applied to the film during practice of the present system has been limited only by the ability of the light source to produce more light.

Intimate contact between the emulsion and a solid cooling plate, of a cooling-chamber is maintained, during projection of a picture, by air pressure, uniformly applied across the film base. Highly efficient heat transfer from the emulsion to the cooling plate and thence to the coolant permits a nonpressurized circulation system which further permits use of a very thin cooling plate.

Since the coolant circulation system is a free-flowing nonpressurized system areas of unequal pressure are eliminated and self-purging of gas by a liquid coolant is held to a minimum. In addition, an air trap free coolant system is provided which promotes elimination of air bubbles from the circulation system.

Another feature of the present invention, made practical because of a highly efficient heat transfer system, is a single cooling-chamber gate. A single-cooling chamber gate, as opposed to a dual-cooling chamber gate, refracts and/or absorbs less light and therefore has less light loss so that more efficient use of the light energy actually generated and provided is made so that essentially more lumens incident to the screen per square inch of aperture is obtained with less light originally generated.

It is therefore an object of the invention to provide an improved film cooling projector film gate.

Another object is to provide an improved film trap which includes a highly efficient film cooling chamber.

Another object is to provide a film trap which includes an improved fluid film cooling chamber.

Another object is to provide a film trap which includes an improved film cooling chamber which reduces the light loss after passage of the light through the film so that a greater percentage of light generated is used in projection of a picture.

Another object is to provide an improved film cooling projection film gate utilizing a liquid coolant in conjunction with a bubble-free coolant circulation system.

These and other objects will become apparent from reading the following description with reference to the accompanying drawings in which:

FIG. 1 is a front view of the film cooling chamber of the film gate;

FIG. 2 is a sectional view taken on the line 2—2 of FIG. 1;

FIG. 3 is a sectional view taken on the line 3—3 of FIG. 2;

Figure 4:
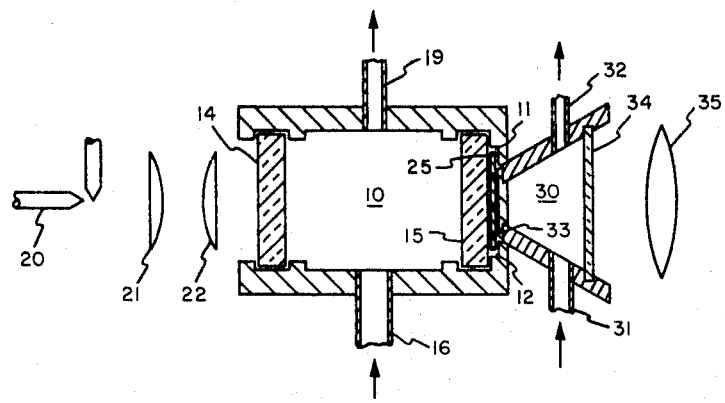
FIG. 4 is a graphic illustration of one form of the invention.

Referring to FIG. 1, a cooling chamber, which may be incorporated in a film gate or film trap, is shown in a front view in which a chamber is formed by window or opening 10 and transparent plates 14 and 15. This is more clearly shown in FIG. 2 where the film frame retaining guides or shoulders 11 and 12 are shown more clearly. In the form of film trap shown in FIGS. 1, 2 and 3, a film frame may be slid into the retaining guides until the film is substantially centered over the opening 10. The opening 10 may serve as an aperture of a projector.

When the FIGS. 1, 2 and 3 are considered together both the external and internal features of the cooling chamber or cell may be clearly seen.

Essentially the cooling chamber is defined by the window or aperture 10 and two separated colorless transparent walls 14 and 15. This may be clearly seen in FIG. 2. The wall 14 may be glass or some other transparent material. The film trap is positioned so that the wall 14 is closest to the source of light. This may be seen in FIG. 4. In the preferred form, wall 15 is a very thin transparent, clear sapphire plate and serves as the cooling plate. The coolant is flowed through the cavity of the cooling chamber thus coming into contact with the interior surface of the sapphire plate 15. The film which is to be cooled is positioned so that its emulsion surface makes intimate contact with the exterior surface of the cooling plate 15. It is most desirable that the emulsion side of the film be in intimate contact with the cooling plate since this is the portion of the film frame which absorbs the most heat. In addition, the emulsion is more sensitive to heat than the film base. Thus if the emulsion is maintained at safe temperatures, the film base will be cool enough to avoid damage to it.

The film chip may be held in a frame and the frame positioned in the guides 11 and 12. By so positioning the film and/or film frame, the film will essentially be suspended in front of the aperture and over the exterior surface of the cooling plate 15. The cooling plate 15 and the transparent wall 14 may each be very thin, their thickness depending mainly upon their respective ability to contain the coolant flowing through the chamber. The walls 14 and 15 would be sealed to prevent leakage of the coolant from the cavity.

It will also be seen that at opposite ends of the cavity formed by window 10 and the walls or plates 14 and 15 are a plurality of inlet and outlet ducts coupling the cooling chamber to inlet and outlet cavities. When employing a coolant (which may be liquid or gas) the coolant enters the cooling chamber via the inlet tube 16 and flows into the inlet cavity 17. The inlet cavity and other internal passages are shown in broken line form in FIG. 1. The outlet cavity 18 and outlet tube 19 are more clearly shown in FIG. 3. Also more clearly shown in FIG. 3 are the outlet ducts between the cooling chamber cavity or opening 10 and the outlet cavity 18. Such ducts are also positioned between the inlet chamber 17 and the cooling chamber.

In the preferred embodiment the inside wall of the uppermost ducts (inlet 17a and outlet 18a) are at substantially the same level as the upper interior wall or part of the cooling chamber cavity. This is clearly shown in FIG. 3. This avoids trapping air in the cavity if any air should be in the circulation system at this point. In addition, such couplings do not constrict the fluid flow so as to change any pressure within the system and provide for even distribution of flow into the cooling chamber.

With the construction as set forth in FIGS. 1, 2 and 3 in mind, attention is now directed to FIG. 4. In FIG. 4 the inlet 16 and outlet 19 are represented as located on the bottom and top, respectively, of the cooling chamber cavity. Such arrangement would merely reposition the inlet, inlet cavity and inlet ducts to below the cooling chamber cavity 10 and the outlet ducts, outlet cavity and outlet to above the cooling chamber cavity.

FIG. 4 represents parts of a projector in which a source of light 20 is represented by two arc lamp rods. Lenses 21 and 22 represent an optical system for focusing or gathering the light generated by the arc lamp and directing it through the window or aperture 10 of the cooling chamber. The window or opening 10 essentially forms the aperture of the projector. The film 25 is represented as pressed against the outside surface of the sapphire plate 15. It will be seen that the film extends into the upper and lower retaining guides 11 and 12. The film may be supported in a frame or aperture card or may be a strip of film but would be so supported that the part of the film 25 through which light is projected makes intimate contact with the external surface of the sapphire plate 15.

In order to insure intimate contact between the film 25 and the sapphire plate 15, a pressure chamber 30 is provided to exert a gentle, evenly distributed force or pressure across the entire surface of the film and hold the entire emulsion surface area of the film 25 against the sapphire plate 15 so as to affect heat transfer via intimate contact (conduction) with the cooling plate.

The pressure chamber 30 has an inlet 31 into which air is forced and an outlet 32, which may be restricted in a suitable manner in order to maintain essentially constant pressure inside the chamber somewhat above normal outside pressure. Air may be pumped into the inlet 31 via an ordinary air pump (not shown).

A gasket, such as 33, which may be resilient pressure gasket, serves as a seal between the pressure chamber and the film 25. A transparent plate 34 is provided across the far end of the chamber so that the light passing through the film may be passed through the pressure chamber and to the projection lens 35. The plate 34 may be a glass of the projection lens 35.

The pressure chamber may be on a pivot or on slides which will permit the entire chamber to swing or otherwise move forward and release the film 25 so that the film chip or strip may be removed from the film retaining guides and also permit insertion of another film.

The pressure chamber shown in FIG. 4 may be employed in association with a film trap-cooling chamber designed for still picture projection of slides, for example. It will be appreciated that the film retaining guides are larger than the film chip, as the film is normally, although not necessarily, retained in a holder or aperture card.

Figure 5:
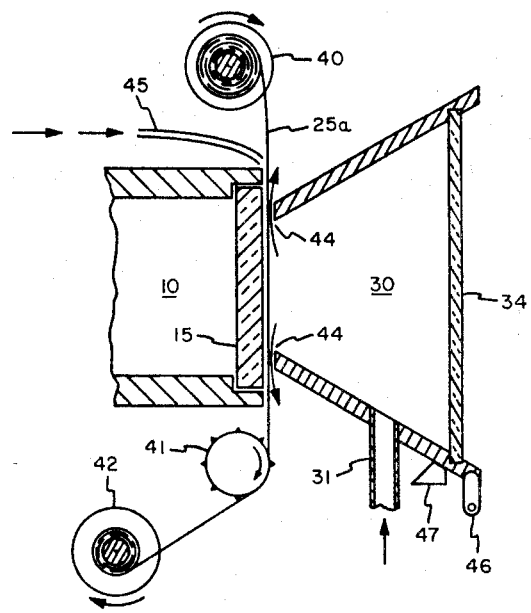
FIG. 5 is a graphic illustration of another form of the invention.

FIG. 5 is an alternate arrangement of pressure chamber which may be used for strip film or for motion picture projection.

In this arrangement the film retaining guides on the cooling chamber have been eliminated. It will be seen that the strip film 25a is passed in front of the window of the cooling chamber 10. The film may be stored on a reel such as 40 and may be pulled off reel 40 by the toothed sprocket 41 and restored on the reel 42. The sprocket 41 and reels 40 and 42 may cooperate to move the strip film a frame at a time, as is the practice in the projection of motion pictures. A shutter (not shown) may also be included in the mechanism, as is normal with motion picture projectors.

In this arrangement the pressure chamber 30 has an inlet tube 31 but the outlet is the entire end of the chamber. The end of the chamber at 44 is practically closed by the close proximity of the film next to the cooling chamber cooling plate 15, with the chamber 30.

The air, under pressure, bleeds out of the pressure chamber as indicated by the arrows at 44. The increased air pressure in the chamber 30 presses the film 25a against the cooling plate 15. The evenly distributed air pressure over the surface of the film in the gate presses the emulsion side against the external surface of the cooling plate. This provides the intimate contact action between the film 25a and the cooling plate 15.

In order to prevent the film 25a from adhering to the exterior surface of the sapphire plate 15 upon pull-down, an air hose 45 is provided which blows a short burst or jet of air between the film 25a and the sapphire cooling plate 15. The air blast passed through the air hose 45 may be pulsed and synchronized so that the air pulse or blast occurs just prior to the action of the sprocket which pulls down the film strip.

If desired, the pressure chamber 30 may be pivoted away from the front of the cooling plate of the cooling chamber. In this respect a pivot 46 is provided along with a stop 47.

Obviously, the air blast or jet as provided by hose 45, the pivoting of the pressure chamber and the pull-down of the film would be synchronized.

In the alternative the air pressure in the chamber 30 may be pulsed instead of pivoting the chamber. In another arrangement the chamber 30 may be pivoted and the air pressure in the chamber 30 may be pulsed, in synchronism.

The methods associated with the apparatus in FIGS. 4 and 5 provide the intimate contact desired between the film 25a and the sapphire plate 15 during the time light is passed through the film.

Figure 6:
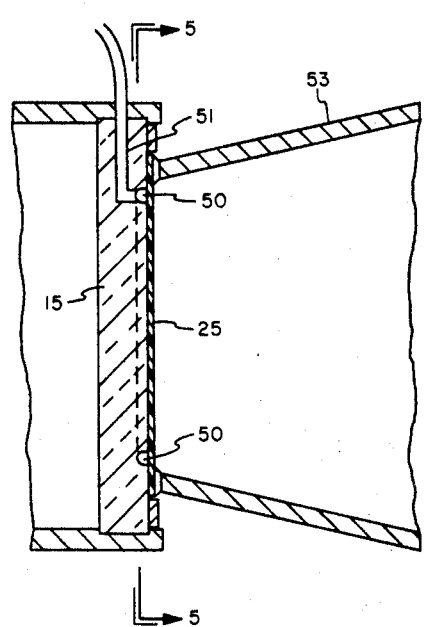
FIG. 6 is a sectional view of an alternate method of developing intimate contact between a film and the cooling plate.
Figure 6A:
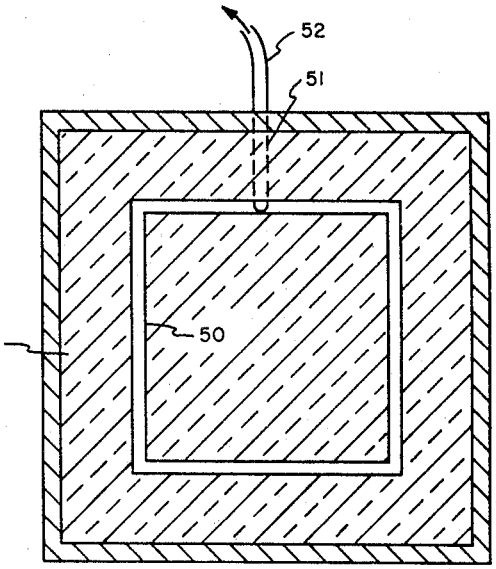
FIG. 6a is a sectional view taken on the line 5—5 of FIG. 6.

Another arrangement for securing intimate contact betwen the emulsion side of the film and the sapphire cooling plate of a cooling chamber is shown in FIGS. 6 and 6a. The cooling plate 15 of the cooling chamber is channeled or grooved on the external surface. This may be more clearly seen in the drawing of FIG. 6a which is intended to show the channel in the sapphire cooling plate from a front view.

The channel 50 is connected to an internal channel or duct 51, cut, drilled or otherwise provided from one part of the surface channel through the interior of the plate to one of the end surfaces of the plate 15.

A suction hose 52 may be connected to the internal channel 51 and when a film is positioned on the plate 15 the film may be made to intimately contact the sapphire plate by providing an under-pressure area between film and plate which would cause the film to be pressed against sapphire cooling plate by atmospheric pressure. In order to insure that the air is sucked from the central area between the film 25 and the cooling plate 15, a funnel-shaped sealing member 53 is provided which presses the film on the outside of the channel against the sapphire plate. This essentially forms a seal around the outside of the channel so that air from the area of the film which is inside the channel will be sucked out via action of the suction applied to the hose 52 and the channels 51 and 50. Apparatus for making the suction is not illustrated.

It should be understood that FIG. 6a is presented merely to illustrate the suction channel from a surface or front view of the cooling plate 15.

Figure 7:
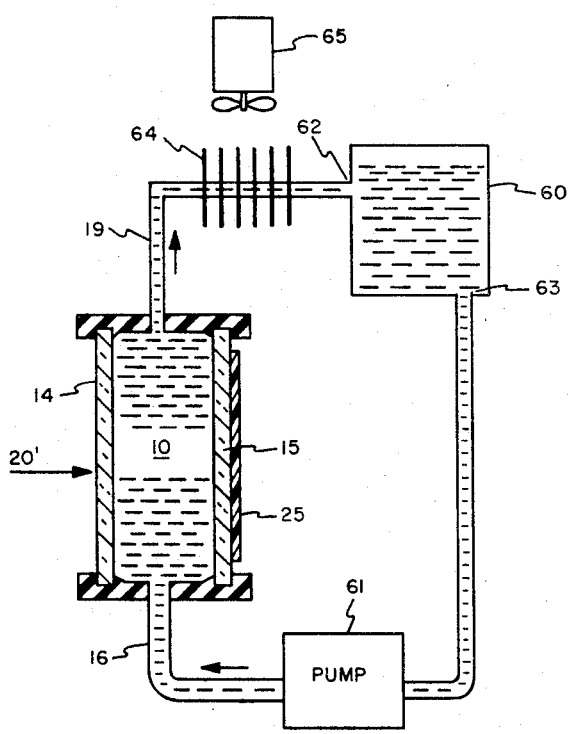
FIG. 7 is a diagrammatic drawing of the liquid coolant circulation system.

Referring now to FIG. 7, a diagrammatic representation of the preferred arrangement of circulation system for the cooling chamber 10 is presented. The coolant may be a substantially colorless, transparent liquid or a colorless, transparent gas. In the preferred arrangement the coolant used is clear, clean water. If the coolant is a gas, the circulation system is envisioned as a closed, substantially sealed system. In the preferred arrangement the liquid coolant circulation system is envisioned as an air-free system.

In order than an air-free anr nonpressurized liquid circulation system be maintained, a sealed circulation system is avoided. A reservoir 60 is positioned at a level above that of the cooling chamber 10. A pump 61 draws liquid from the lower section of the reservoir 60, such as from the bottom and forces or pumps the collant into the inlet 16 of the cooling chamber 10. The collant flows through the chamber and picks up any heat that may be on the internal surfaces of the transparent walls 14 and 15.

Light will be directed in the direction of the arrow 20′. Energy from the light will be absorbed as heat by the film 25, particularly the emulsion, and transferred to the plate 15, by conduction. The transferred heat will travel from the hotter surface of the sapphire plate 15 to the cooler surface where the coolant will absorb the heat and carry the heat away during or by circulation. The coolant flows out of the chamber 10 via outlet 19. The outlet tubing may include a heat sink or heat exchange fins such as 64 which serves to remove the heat from the coolant prior to return of the coolant to the reservoir 60.

It may be preferred to include a motor driven fan such as 65, which may aid in dissipating the heat absorbed from the coolant by the heat exchange unit.

The coolant return 62 is positioned on the upper part of the reservoir 60 and it is preferable to maintain the level of the coolant above the return 62. This assists in maintaining a bubble-free system.

The outlet of the reservoir at 63 is positioned at or near the bottom of the reservoir 60 to insure that the coolant drawn from the reservoir is free from air bubbles. Any air bubbles that may form in the system will be eliminated from the closed (not sealed) circulation system at the high return 62. Obviously if the coolant is cooled gas, bubbles are no problem.

As previously mentioned all air traps in the circulation system have been eliminated. This provides the advantage of having a liquid system which is self-purging of air, which is of particular importance when first charged with the coolant.

In practicing the present invention excellent heat transfer characteristics will be found when the cooling plate of the cooling chamber is a sapphire plate, substantially .040 inch or less in thickness. The heat transfer is so efficient that no refrigeration is necessary and the coolant which is circulated through the system need be circulated very slowly. It has been found that the present system maintains the temperature of emulsion at a safe level during projection with the coolant maintained at or below normal room temperature. As to the amount of coolant flow, the temperature of the emulsion has been maintained at a safe level with a circulation from 2.5 to 5 gallons per hour, during projection of a picture using 35 mm. film. This volume may vary with the size of the aperture and the power of the light source.

An alternate location for the heat sink, or heat exchange, is to incorporate the heat exchange with the reservoir.

By using one cooling chamber and air pressure to effect intimate contact between the emulsion side of the film and the cooling plate, the use of a soft surface or laminated cooling plate having a resilient surface is also avoided. Excellent intimate contact between the substantially flat external surface of the cooling plate and the uneven contoured surface of the emulsion side of the film has been obtained with pressures in the pressure chamber 30 being maintained at from a few pounds per square inch (p.s.i.) to 14 p.s.i., for example. In fact, whether the pressure chamber be increased air pressure or vacuum, a differential in pressure of some 10 p.s.i. has been found to be a good average air pressure differential.

If gas were employed as a coolant, a cold gas having colorless transparent characteristics may be circulated in a sealed system or the system may be an open system, having a constricted outlet at the air chamber outlet. In a system employing gas for a coolant, it may be desired to cool the gas before pumping the gas coolant into the chamber 10.

Although several alternate arrangements of the present invention have been illustrated and described, other arrangements may be made, as will be familiar to those skilled in the art, without departing from the spirit of the invention as defined in the appended claims.

What is claimed is:

1. Apparatus for cooling film in a film gate of a picture projector including,
    a cooling chamber positioned between the light source of the projector and the film, said cooling chamber including,
    an inlet and an outlet separated by a cavity,
    said cavity having transparent opposite walls with the transparent wall most distant from the light source consisting of a sapphire plate,
    said cavity and transparent opposite walls defining the aperture of said projector,
    a coolant circulation system for flowing a coolant through said cavity including,
    means coupled between the outlet and the inlet for inducing circulation of said coolant through said cavity, and
    means for holding the emulsion surface in intimate contact with the outer surface of the sapphire plate.

2. Apparatus for projecting a picture formed in the emulsion surface of a film including:
    a source of intensse light, means for directing said light in a beam through an aperture, a film gate for holding a frame of film across said aperture, said film gate including, a chamber having transparent opposite walls defining said aperture, one of said walls being a sapphire plate, an inlet and an outlet at opposite ends of said chamber, said inlet including a plurality of ports disposed vertically and in parallel relationship along one of said ends, said outlet including a plurality of ports disposed vertically and in parallel relationship along the other of said ends, said chamber being part of a coolant circulation system including, means coupled to said inlet for inducing circulation of the coolant through said system, a reservoir for storing excess coolant said reservoir being coupled to said outlet, means coupling said reservoir to said circulation inducing means for conducting coolant from said reservoir to said inducing means, and means for holding the emulsion surface of the film in intimate contact with the exterior surface of said sapphire wall.

3. Apparatus for projecting a picture as in claim 2 and in which said means for holding includes, an air chamber having an inlet, a transparent side and an open side, opposite said transparent side, means for positioning said air chamber so that said open side and said transparent side are in line with said light source and said aperture, means for further positioning said chamber so that the film closes the open side of said chamber, and means for applying air pressure through said inlet into said air chamber for holding said film in intimate contact with said sapphire wall.

4. Apparatus for projecting a picture as in claim 2 and in which said holding means includes, a concentric open channel on the exterior side of said sapphire wall, a duct passing through the body of said sapphire wall connecting said open channel to an exhaust port, means coupled to said exhaust port for forming a suction, and means for holding the perimeter of said film against said sapphire wall forming a seal causing the suction to withdraw air from between said film and said sapphire wall within the perimeter of said film.

5. Apparatus for projecting a picture as in claim 2 and in which said sapphire plate has a thickness of 0.040 inch.

6. Apparatus for projecting a picture as in claim 2 and in which said means for holding includes, an air chamber having an inlet, a transparent side and an open side, said open side being opposite said transparent side, said air chamber positioned so as to be in line with the beam of light passing through said aperture, with the said open side adjacent the film across said aperture, and in close proximity therewith, means for applying a pulsing air pressure through said inlet into said air chamber so that the air pressure within said chamber is periodically increased above normal air pressure at a pulsating rate for pressing the film against said sapphire wall periodically for providing intimate contact periodically between said film and said sapphire plate, and means for blowing air between said sapphire plate and said film during interpulse air pressure periods for breaking intimate contact between said film and said sapphire plate.

7. Apparatus for projecting a picture as in claim 2 and in which, the inlet ports in the extreme positions are aligned with the outlet ports in corresponding positions, and the inside surfaces of said chamber corresponding to said extreme positions are exactly in line with the extreme inlet and outlet ports opposite each other.

References Cited

UNITED STATES PATENTS

| | | | |
|---|---|---|---|
| 1,231,360 | 6/1917 | Howell | 352—222 |
| 1,770,659 | 7/1930 | Oehmichen | 352—222 |
| 2,413,288 | 12/1946 | Cahill | 88—24 |
| 2,506,765 | 5/1950 | Bach | 352—223 |

OTHER REFERENCES

Encyclopedia Americana, vol. 24, p. 292a.

Journal of the SMPTE, vol. 54, January 1950 pp. 95–101, Walter Bach and Chris Wagner, "Industrial Sapphire in Motion Picture Equipment," 352–221.

NORTON ANSHER, *Primary Examiner.*

MONROE H. HAYES, *Assistant Examiner.*